US010350826B2

(12) United States Patent
Foley et al.

(10) Patent No.: US 10,350,826 B2
(45) Date of Patent: Jul. 16, 2019

(54) VACUUM TUBE OBJECT CLAMPING ARRAY WITH CONFORMABLE PADS

(71) Applicant: XEROX CORPORATION, Norwalk, CT (US)

(72) Inventors: Timothy P Foley, Marion, NY (US); Mark A Atwood, Rush, NY (US); Eliud Robles Flores, Rochester, NY (US); D Clay Johnson, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 166 days.

(21) Appl. No.: 15/477,125

(22) Filed: Apr. 3, 2017

(65) Prior Publication Data

US 2018/0281316 A1 Oct. 4, 2018

(51) Int. Cl.

*B29C 64/20* (2017.01)
*B29C 64/379* (2017.01)
*B29C 64/40* (2017.01)
*B29C 64/35* (2017.01)
*B65G 47/91* (2006.01)

(52) U.S. Cl.

CPC .............. *B29C 64/20* (2017.08); *B29C 64/35* (2017.08); *B29C 64/379* (2017.08); *B29C 64/40* (2017.08); *B65G 47/918* (2013.01)

(58) Field of Classification Search

CPC ... B25B 11/005; B65H 3/0808; B65H 3/0883; B65H 29/003; B65H 29/24; B65H 29/241; G01N 33/085; B23Q 3/088; B29C 64/379; B29C 64/30; B33Y 40/00
USPC .................................... 29/281.5; 269/21, 20
See application file for complete search history.

(56) References Cited

U.S. PATENT DOCUMENTS 4,793,657 A * 12/1988 Mense ................. B25J 15/0616 271/91
6,149,375 A * 11/2000 Hebrank ................ A01K 43/00 414/737
6,257,564 B1 * 7/2001 Avneri .................. B25B 11/005 269/21
9,821,474 B2 * 11/2017 Reinhold ............. B65H 3/0816

FOREIGN PATENT DOCUMENTS

WO WO 2015123128 A1 * 8/2015 .......... B25J 15/0023

OTHER PUBLICATIONS

See STIC Search attached; See WIPO Document translation attached.*
U.S. Appl. No. 15/163,880, filed May 25, 2016, and entitled System for Printing on Three-Dimensional (3D) Objects by Wayne A. Buchar et al.

* cited by examiner

*Primary Examiner* — Monica S Carter
*Assistant Examiner* — Abbie E Quann

(57) ABSTRACT

A universal object holding mechanism for holding three-dimensional objects for printing thereon uses an array of suction cups mounted at the ends of retractable tubes. The array is pressed into an object which in turn is pressed against a datum surface that represents a print head. Vacuum is applied through the tubes to the suction cups which grip the object. The suction cup walls are hollow and filed with particulates that cause the cup to become rigid when the vacuum is applied. This contributes to keeping the object from moving due to flex in the suction cup when it is being moved past the print head.

17 Claims, 6 Drawing Sheets

VACUUM TUBE OBJECT CLAMPING ARRAY WITH CONFORMABLE PADS

CROSS REFERENCE TO RELATED APPLICATIONS

Cross-referenced is commonly assigned to U.S. application Ser. No. 15/477,127, filed Apr. 3, 2017, now U.S. Pat. No. 9,925,726, and entitled APPARATUS FOR HOLDING DURING THREE-DIMENSIONAL (3-D) OBJECTS DURING PRINTING THEREON by Jeffrey J. Bradway et al; U.S. application Ser. No. 15/477,127, filed Apr. 3, 2017, now U.S. Publication No. 2018-0282086, and entitled UNIVERSAL PART GRIPPER WITH CONFORMABLE TUBE GRIPPERS by Linn C. Hoover et al; U.S. application Ser. No. 15/477,427, filed Apr. 3, 2017, now U.S. Publication No. 2018-0281305, and entitled SPRING LOADED SUCTION CUP ARRAY GRIPPER by Paul M. Fromm et al; U.S. Provisional Application Ser. No. 62/480,563, filed Apr. 3, 2017, and U.S. Non-Provisional application Ser. No. 15/626,200, filed Jun. 19, 2017, now U.S. Pat. No. 10,087,020, and entitled UNIVERSAL OBJECT HOLDER FOR 3-D PRINTING USING A CONFORMABLE GRIPPER BALL by Erwin Ruiz et al; U.S. application Ser. No. 15/477,439, filed Apr. 3, 2017, now U.S. Publication No. 2018-0281306, and entitled UNIVERSAL PART GRIPPER USING 3-D PRINTED MOUNTING PLATE by Linn C. Hoover et al; U.S. application Ser. No. 15/477,454, filed Apr. 3, 2017, now U.S. Publication No. 2018-0281199, and entitled APPARATUS FOR GENERAL OBJECT HOLDING DURING PRINTING USING MULTIPLE CONFORMABLE BALLS by Jeffrey J. Bradway et al; U.S. application Ser. No. 15/477,464, filed Apr. 3, 2017, now U.S. Pat. No. 9,925,799, and entitled AIR PRESSURE LOADED MEMBRANE AND PIN ARRAY GRIPPER by Paul M. Fromm et al; U.S. application Ser. No. 15/477,488, filed Apr. 3, 2017, now U.S. Publication No. 2018-0281464, and entitled APPARATUS FOR REPEATABLE STAGING AND HOLDING OBJECTS IN A DIRECT TO OBJECT PRINTER USING AN ARRAY OF PINS by Jeffrey J. Bradway et al; and U.S. application Ser. No. 15/477,478, filed Apr. 3, 2017, now U.S. Pat. No. 10,086,518, and entitled SPRING LOADED IRIS MECHANISM STACK GRIPPER by Paul M. Fromm et al; all of which are included in their entirety herein by reference.

TECHNICAL FIELD

This disclosure relates generally to a system for printing on three-dimensional (3-D) objects, and more particularly, to an apparatus adapted for general object holding in a non-production environment.

BACKGROUND

Commercial article printing typically occurs during the production of the article. For example, ball skins are printed with patterns or logos prior to the ball being completed and inflated. Consequently, a non-production establishment, such as a distribution site, which customizes products, for example, in region in which potential product customers support multiple professional or collegiate teams, needs to keep an inventory of products bearing the logos of the various teams. Ordering the correct number of products for each different logo to maintain the inventory can be problematic.

One way to address these issues in non-production outlets would be to keep unprinted versions of the products, and print the patterns or logos on them at the distribution site. Adapting known printing techniques, such as two-dimensional (2D) media printing technology, to apply image content onto 3-D objects would be difficult. Since the surfaces to be printed must be presented to the print heads as relatively flat, two-dimensional surfaces, the objects have to be maneuvered carefully to present portions of the articles as parallel planes to the print heads.

One Direct-to-Object printing system that accomplishes this is disclosed in copending and commonly assigned U.S. patent application Ser. No. 15/163,880, filed on May 25, 2016, now U.S. Pat. No. 9,827,784, and entitled SYSTEM FOR PRINTING ON THREE-DIMENSIONAL (3D) OBJECTS by Wayne A. Buchar et al. This printing system includes a plurality of print heads arranged in a 2-D array, each printhead being configured to eject marking material, a support member positioned to be parallel to a plane formed by the 2-D array of print heads, a member movably mounted to the support member, an actuator operatively connected to the movably mounted member to enable the actuator to move the moveably mounted member along the support member, an object holder configured to mount to the movably mounted member to enable the object holder to pass the array of print heads as the moveably mounted member moves along the support member, and a controller operatively connected to the plurality of print heads and the actuator, the controller being configured to operate the actuator to move the object holder past the array of print heads and to operate the plurality of print heads to eject marking material onto objects held by the object holder as the object holder passes the array of print heads. This application is included herein by reference to the extent necessary to the practice the present disclosure and in its entirety.

A problem with this approach is that it requires a unique part holder for each part that is to be printed. Presently, printers come with a set of standard object holders and additional holders must be ordered for other objects and even variations in the shape of "standard" objects. Additionally, suction cups currently used in picking up objects for printing thereon do not securely hold the objects in place. The soft suction cup material will flex and allow movement. The suction cup devices are fixed either in place or on conformable sheet assemblies.

SUMMARY

In answer to these shortcomings, disclosed is a universal holder for many types of objects. The universal holder includes an array of suction cups mounted at the ends of retractable tubes. The array is pressed into an object which in turn is pressed against a datum surface that represents print heads. Vacuum is applied through tubes to the suction cups which grip the object. The suction cup walls are hollow and filled with particulates that cause the cup to become rigid when the vacuum is applied. This helps keep the object from moving due to flex in the suction cup when it is being moved past the printheads. The retractable tubes are locked in position with an elastomer tube position locker once they have moved to confirm conformed to the shape of the object.

BRIEF DESCRIPTION OF THE DRAWINGS

The foregoing aspects and other features of a printing system that prints images on 3-D objects are explained in the following description, taken in connection with the accompanying drawings.

DETAILED DESCRIPTION

Figure 1:
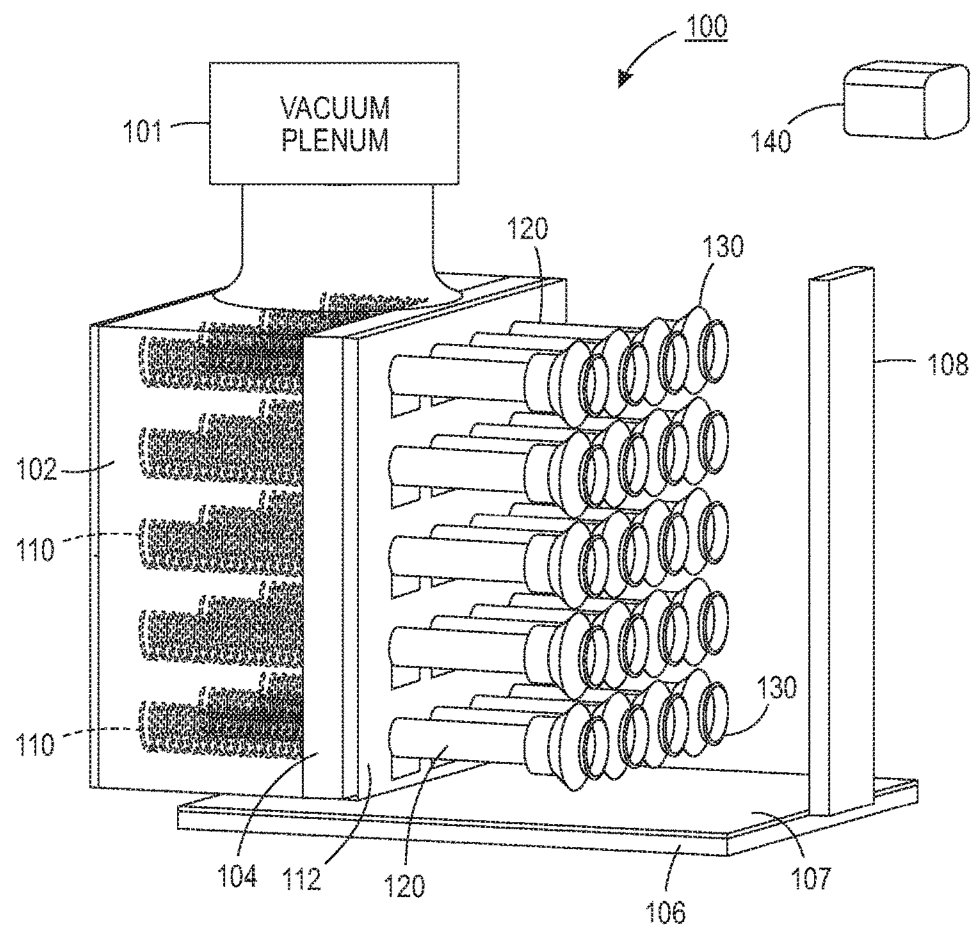
FIG. 1 illustrates an exemplary universal 3-D object holder that includes a suction cup array in an object capturing position.

For a general understanding of the present embodiments, reference is made to the drawings. In the drawings, like reference numerals have been used throughout to designate like elements.

Turning now to the present disclosure, a generic or universal object holder 100 in FIG. 1 includes a vacuum manifold box 102 connected to a vacuum plenum 101 and a suction array having a high density of suction tubes 120 loaded against retaining springs 110. A locking plate 112 configured for sliding movement against a front plate 104 of manifold 102 for stabilizing the suction tubes once an object has been acquired. Suction tubes 120 are adapted to be attached to objects to be acquired and extend from vacuum manifold box 102 and have suction cups 130 attached to outermost ends thereof for engagement with an object. In the example shown, vacuum manifold box 102 includes an array of suction cups 130 that are capable of holding small objects like a bottle cap or a pen to much larger objects, e.g., about 200×200 mm. Vacuum manifold box 102 is shown resting on a base member 106 that is covered by an elastomer 107. Fingers 114 on locking plate 112 are shown extending into recesses within elastomer 107 and a portion of base member 106. By extending into only a portion of base member 106 in this position, locking plate 112 is lifted from the spring-loaded vacuum tube array and thereby allows vacuum tubes 120 to slide freely into and out of front plate 104 of manifold 102. A staging surface of stationary datum 108 is used to represent the datum defined by print head 140 of a printer.

Figure 2:
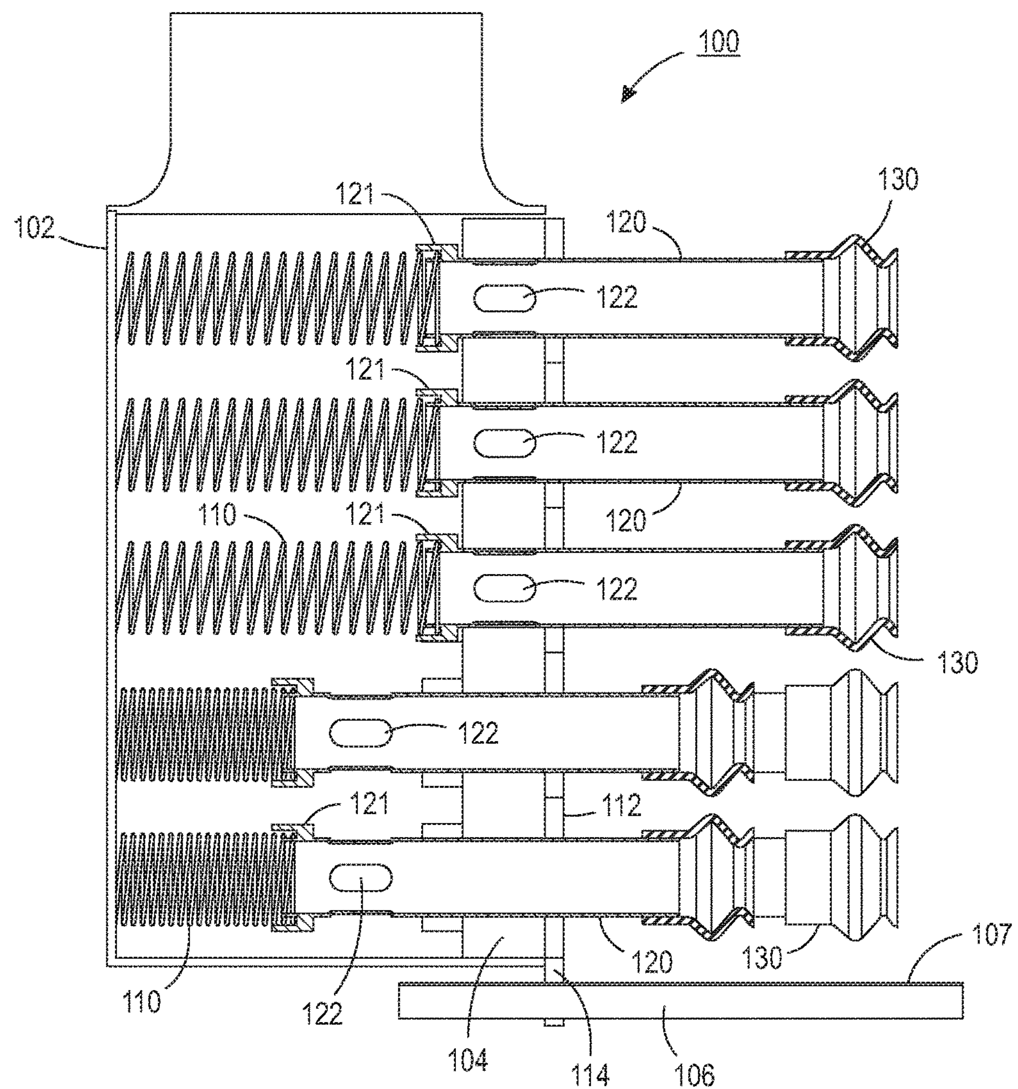
FIG. 2 illustrates the exemplary universal 3-D object holder in FIG. 1 with some of the suction array in a home position and other parts of the suction cup array in an actuated position.

FIG. 2 shows some of hollow suction tubes 120 pushed into a home or extended position by springs 110 and others in an actuated position caused by contact with an object. Each suction tube 120 includes a suction cup 130 at an object-contacting end thereof and an opposite end that includes an opening 122 therein and is closed by an end cap 121. Front plate 104 is attached to vacuum manifold box 102 and has openings therein for the reciprocal movement of suction tubes 120 into and out of vacuum manifold box 102. When suction tubes 120 are pushed by an object and vacuum is applied, air will move out of the holes at the top of the suction tubes causing suction cups 130 to seal around the object. Suction tubes 120 not pushed in by the object are blocked by front plate 104 from vacuum flow.

Figure 3:
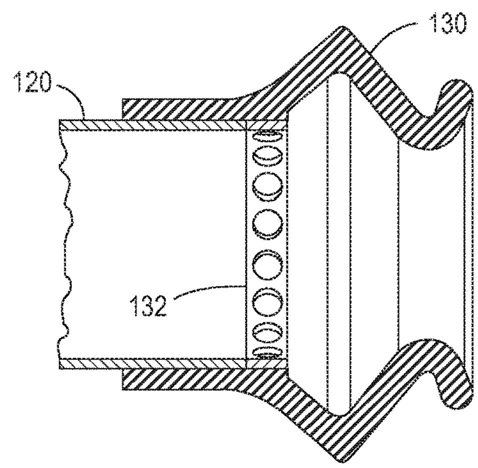
FIG. 3 is a cross-sectional view of a suction cup used in the suction cup array of FIG. 1.

A cross-section of a suction cup in accordance with the present disclosure is shown in FIG. 3 that includes cup 130 fitted onto tube 120. Suction cup 130 has walls that are molded hollow and is preferably made of Silicone although other similar materials can be used if desired. The hollow walls of the suction cup are filled with coarse sand-like material to promote conformability to odd shapes. Alternatively, the hollow wall could be bulbous in shape to increase conformability for different shaped objects. A vented ring 132 is included at an entrance portion of the suction cup to allow vacuum to access the insides of the hollow walls of the suction cup. When vacuum is applied through tube 120, the suction cup seals against an object, and simultaneously, as the vacuum rises it compresses the course sand-like filler in the walls of the suction cup locking the suction cup solidly in the shape it has taken. Thus, creating a more solid fixed clamping action on the object, and making suction cup 130 more rigid.

Figure 4:
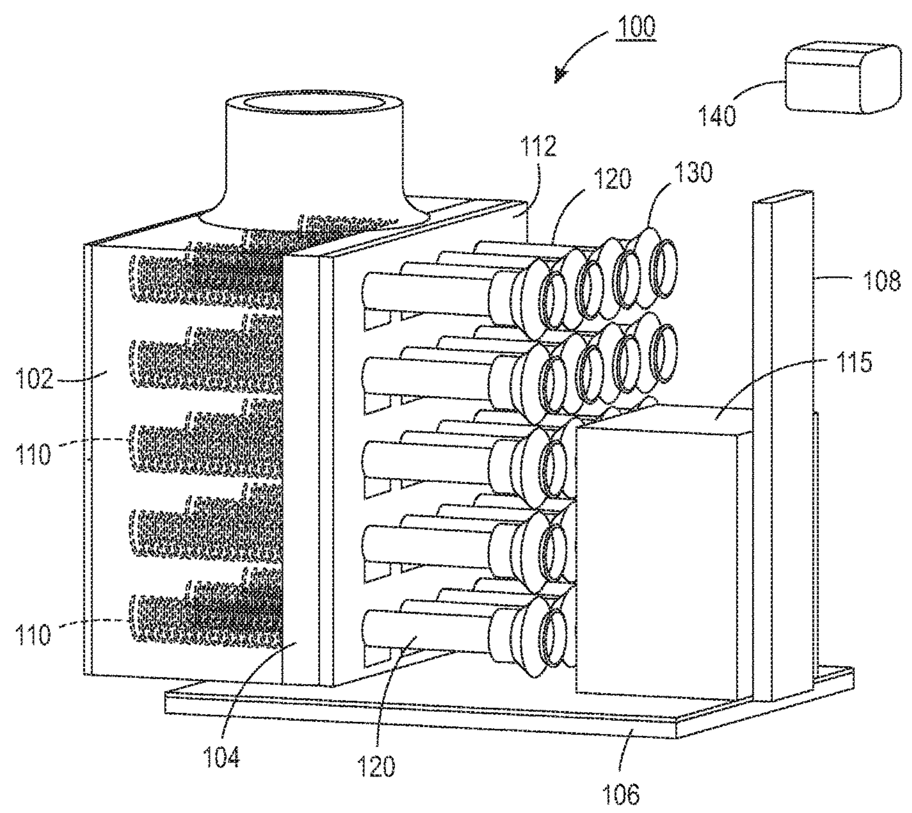
FIG. 4 depicts the universal 3-D object holder in FIG. 1 contacting an object.
Figure 5:
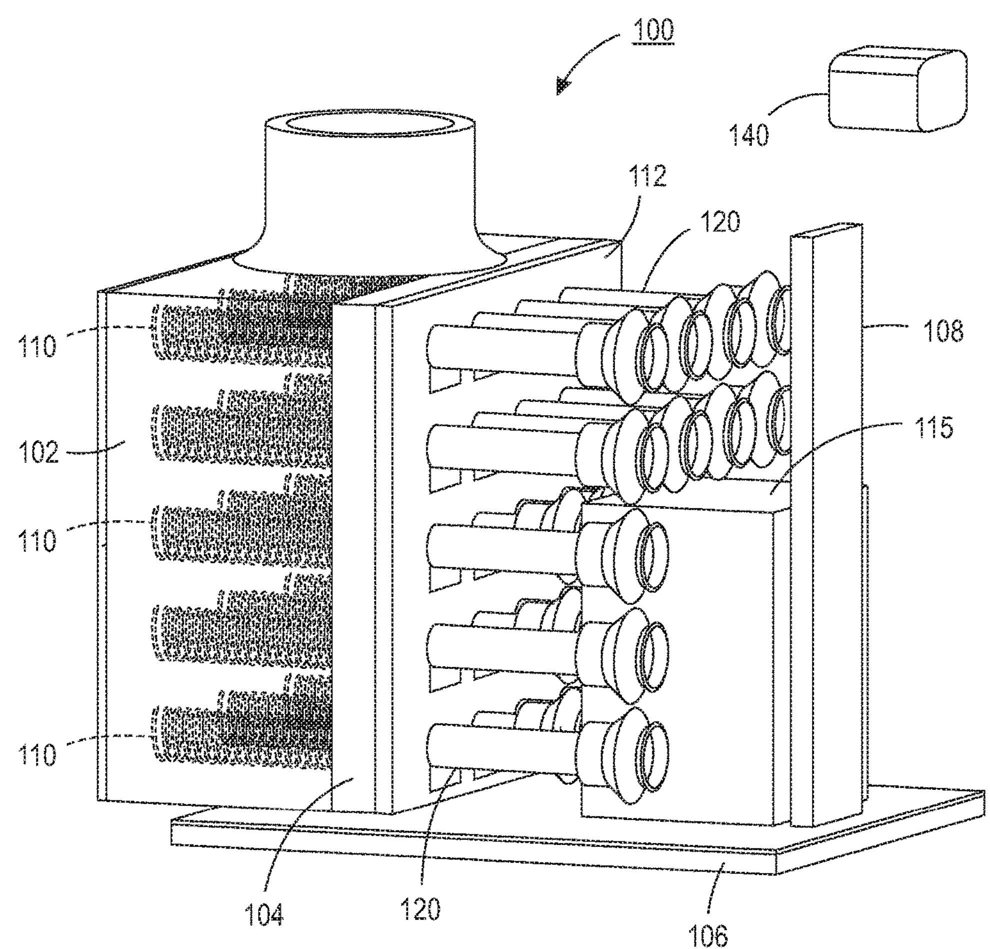
FIG. 5 shows the universal 3-D object holder in FIG. 4 with parts of the suction cup array displaced by an object.

Universal object holder 100 in FIG. 4 is shown with suction cups 130 immediately adjacent an object 115 that is to be printed upon by print head 140 positioned against datum 108 and in FIG. 5 the suction array has been pushed into object 115 with some of the suction tubes 120 contacting object 115 and now extending into vacuum manifold box 102 opening vacuum ports 122 to facilitate acquiring the object. Vacuum in the blocked suction tubes enhances acquiring the object. The vacuum also compresses the sand-like material inside eth suction cup locking it rigidly in its new shape.

Figure 6:
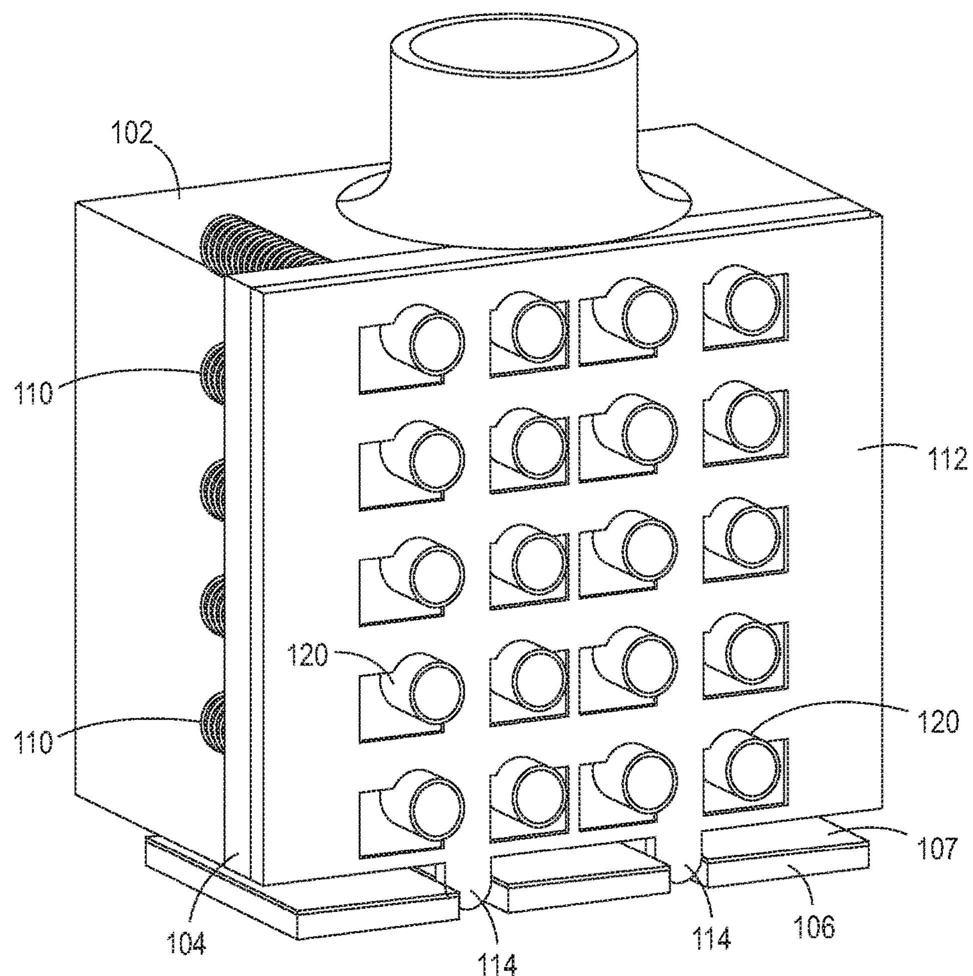
FIG. 6 is a partial illustration of the suction array of FIG. 1 depicting a tube position locker in a home and unlocked position.
Figure 7:
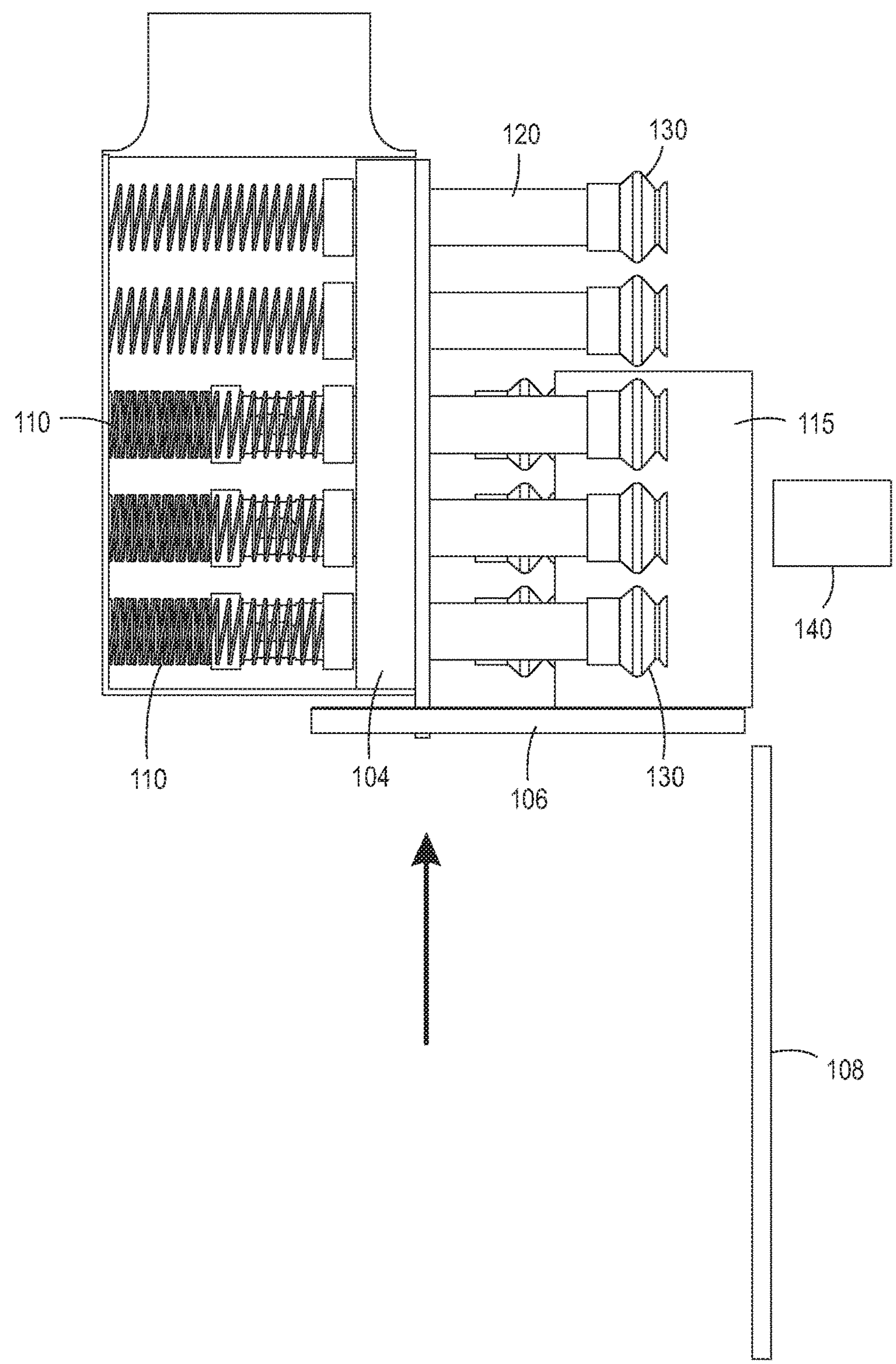
FIG. 7 depicts the suction array of FIG. 6 with the tube position locker in an actuated position.

In FIG. 6, elastomer tube position locker 112 is shown including fingers 114 with wedge shaped ends that are positioned within open areas of base member 106. Fingers 114 serve to lift elastomer tube position locker 112 off suction tubes 120 while the suction tubes are in their object acquiring position in FIG. 5 to allow any suction tubes that contact an object to be pushed back into vacuum manifold box 102 without tube position locker interference. When vacuum manifold box 102 and base member 106 are lifted toward print head 140 as shown in FIG. 7, elastomer tube position locker 112 applies a slight interference on each tube to stop motion along its axis and keep each tube axially set once it has conformed to the shape of the object. When vacuum manifold box 102 and base member 106 are returned to the loading position, force applied to the two bottom tabs 114 move elastomer tube position locker 112 away from tubes 120 and unlock their motion.

It should now be understood that a universal object holder that can be used for holding objects in Direct-to-Object printing has been shown that includes a staging surface that represents the datum defined by the machine print heads. The object to be printed upon is staged against this datum. A manifold assembly with slidable vacuum tubes is moves toward the object. The vacuum tubes adjust to the object by sliding back into the manifold assembly opening vacuum ports in the vacuum tubes to vacuum flow, which secures the object in place. The vacuum tubes include suction cups having hollow walls filled with particulates on ends thereof that cause the cup to become rigid when the vacuum is applied for enhanced control of the object. An elastomer locking member is use to secure the vacuum tubes from axial movement when the manifold assembly is moved to the printing area.

It will be appreciated that variations of the above-disclosed apparatus and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A universal object holder for a 3-D printing system, comprising:

a vacuum manifold box, said manifold vacuum box including a front plate;

an elastomer tube position locker positioned adjacent to said front plate;

a suction array of slidably adjustable tubes adapted to slide within said vacuum manifold box and said elastomer tube position locker, said slidably adjustable tubes including deformable suction cups attached to one end thereof, and wherein said elastomer tube position locker includes fingers extending with respect to a base member such that when said vacuum manifold box is positioned on said base member said array of slidably adjustable tubes can be pushed into said vacuum manifold box without interference from said elastomer tube position locker; and springs positioned only within said vacuum manifold box and loaded against each of said suction array of slidably adjustable tubes.

2. The universal object holder of claim 1, including a base member, said base member including an elastomer cover.

3. The universal object holder of claim 1, wherein lifting of said vacuum manifold box causes said elastomer tube position locker to move downward against said array of slidably adjustable tubes and provide interference there between and thereby prevent axial movement of said array of slidably adjustable tubes.

4. The universal object holder of claim 3, including a staging surface against which an object to be printed upon by a print head is staged against, representing a datum defined by the location of the print head.

5. The universal object holder of claim 1, wherein said deformable suction cups include a vented ring to allow vacuum to be applied into said suction cups.

6. The universal object holder of claim 5, including a vacuum plenum connected to said vacuum manifold box, and wherein application of vacuum flow to said deformable suction cups causes said deformable suction cups to become locked by said vacuum flow to a deformed shape and angle.

7. The universal object holder of claim 6, wherein said front plate is adapted to block said vacuum flow to individual tubes of said array of slidably adjustable tubes not contacting an object.

8. The universal object holder of claim 7, wherein said springs rest on cap portions of said suction array of slidably adjustable tubes.

9. An apparatus for holding various object shapes in a 3-D printing system, comprising:

an array of conformable suction cups mounted at a first end of retractable tubes;

a vacuum source adapted to apply vacuum flow within said retractable tubes;

a vacuum manifold connected to said vacuum source, said vacuum manifold including a face plate and wherein said retractable tubes are slidably positioned with a portion thereof within said face plate and a second portion thereof extending outside said face plate when said retractable tubes are in a home position, and wherein said retractable tubes are adapted to extend into said vacuum manifold when said retractable tubes are pushed into an object and thereby assume an actuated position;

an elastomer tube position locker positioned adjacent said front plate of said vacuum manifold with said retractable tubes extending there through, and wherein said elastomer tube position locker is adapted to allow said retractable tubes to slide into and out of said vacuum manifold without interference when in a first position and provide interference to prevent axial movement of said retractable tubes when said elastomer tube position locker is in a second position; and a vented ring positioned at an entrance within each of said conformable suction cups, and wherein said vented ring allows the vacuum flow within said conformable suction cups such that application of the vacuum flow to said conformable suction cups to seize the object causes said conformable suction cups to deform and become rigid and thereby hold the object.

10. The apparatus of claim 9, wherein said elastomer tube position locker is moved from said first position to said second position upon lifting of said vacuum manifold.

11. The apparatus of claim 10, wherein said elastomer tube position locker includes fingers that prevent interference between said retractable tubes and said elastomer tube position locker when in said first position.

12. The apparatus of claim 11, wherein said face plate of said vacuum manifold blocks the vacuum flow through retractable tubes that are not engaging the object.

13. The apparatus of claim 11, including springs positioned only within said vacuum manifold and biased against end caps of said retractable tubes.

14. The apparatus of claim 9, wherein said elastomer tube position locker is deformable.

15. The apparatus of claim 14, including a base onto which said vacuum manifold engages, said base including a datum member.

16. A holder for securing objects of different sizes during 3-D printing system, comprising:

a vacuum plenum;

a vacuum manifold chamber connected to said vacuum plenum, said vacuum manifold chamber including a front plate with an array of retractable tubes extending at least into said front plate;

an array of conformable suction cups mounted at a first end of each of said retractable tubes with a second end thereof adapted to receive vacuum flow from said vacuum plenum;

a vented ring within an entrance of each of said conformable suction cups, and wherein said vented ring facilitates the vacuum flow within said conformable suction cups such that application of the vacuum flow to said conformable suction cups causes said conformable suction cups to deform around an object and become rigid and thereby hold the object in place; and a deformable locking plate positioned adjacent said front plate of said vacuum manifold chamber with said retractable tubes extending therethrough, and wherein said deformable locking plate is adapted to allow said retractable tubes to slide into and out of said vacuum manifold chamber without interference when in a first position and provide interference to prevent axial movement of said retractable tubes when said deformable locking plate is in a second position.

17. The apparatus of claim 16, wherein said deformable locking plate is moved from said first position to said second position upon lifting of said vacuum manifold chamber.

* * * * *